US007099896B2

(12) United States Patent
Fields et al.

(10) Patent No.: US 7,099,896 B2
(45) Date of Patent: Aug. 29, 2006

(54) SYNCHRONIZING DATA BETWEEN DISPARATE SCHEMAS USING COMPOSITE VERSION

(75) Inventors: Craig A. Fields, Cambridge, MA (US); Chao Young Lee, Weston, MA (US); George A. Madrid, Cambridge, MA (US); Sanjay S. Vakil, Arlington, MA (US); Richard P. Kozak, Worcester, MA (US); Andrew J. Toth, Crownsville, MD (US)

(73) Assignee: PatientKeeper, Inc., Newton, MA (US)

( * ) Notice: Subject to any disclaimer, the term of this patent is extended or adjusted under 35 U.S.C. 154(b) by 0 days.

(21) Appl. No.: 10/356,366

(22) Filed: Jan. 30, 2003

(65) Prior Publication Data

US 2003/0177408 A1    Sep. 18, 2003

Related U.S. Application Data

(63) Continuation-in-part of application No. 10/237,549, filed on Sep. 6, 2002, now abandoned, which is a continuation of application No. 10/118,598, filed on Apr. 8, 2002, now abandoned.

(60) Provisional application No. 60/282,249, filed on Apr. 6, 2001, provisional application No. 60/282,131, filed on Apr. 6, 2001.

(51) Int. Cl.
*G06F 17/30* (2006.01)

(52) U.S. Cl. .................. 707/202; 707/201; 707/104.1; 345/762

(58) Field of Classification Search ................ 707/201, 707/3, 7, 104.1, 10, 203, 8, 102, 202; 345/762; 709/226, 217, 225
See application file for complete search history.

(56) References Cited

U.S. PATENT DOCUMENTS

| 5,392,390 | A | * | 2/1995 | Crozier | 345/762 |
| 5,857,201 | A | * | 1/1999 | Wright et al. | 707/104.1 |
| 6,000,000 | A | * | 12/1999 | Hawkins et al. | 707/201 |
| 6,487,560 | B1 | * | 11/2002 | LaRue et al. | 707/203 |
| 2002/0133508 | A1 | * | 9/2002 | LaRue et al. | 707/202 |

OTHER PUBLICATIONS

Context Management ("CCOW") Specification, Component Technology Mapping: ActiveX, Version CM-1.2, Health Level Seven, Jun. 2000, pp. 1-48.
Context Management ("CCOW") Specification, Technology- and Subject-Independent Component Architecture, Version CM-1.2, Health Level Seven, Jun. 2000, pp. 1-228.
Context Management ("CCOW") Specification, Subject Data Definitions, Version CM-1.2, Health Level Seven, Jun. 2000, pp. 1-32.

(Continued)

*Primary Examiner*—Charles Rones
*Assistant Examiner*—Belix M. Ortiz
(74) *Attorney, Agent, or Firm*—Hamilton, Brook, Smith & Reynolds, P.C.

(57) ABSTRACT

In synchronizing a plurality of handheld devices with a repository, versions of the information in the repository and on the handheld devices are tracked and used to determine the need for updating information in the repository or the handheld device. Data objects are converted from repository data objects into handheld data objects for downloading to the handheld and vice versa for the uploading of data to the repository.

12 Claims, 2 Drawing Sheets

OTHER PUBLICATIONS

Context Management ("CCOW") Specification, Component Technology Mapping: Web, Version CM-1.2, Health Level Seven, Jun. 2000, pp. 1-79.

Context Management ("CCOW") Specification, User Interface: Microsoft Windows and Web Browsers, Version CM-1.2, Health Level Seven, Jun. 2000, pp. 1-17.

* cited by examiner

SYNCHRONIZING DATA BETWEEN DISPARATE SCHEMAS USING COMPOSITE VERSION

RELATED APPLICATION(S)

This application is a continuation-in-part of U.S. application Ser. No. 10/237,549, filed Sep. 6, 2002 now abandoned, which is a continuation of U.S. application Ser. No. 10/118,598, filed Apr. 8, 2002 now abandoned, which claims the benefit of U.S. Provisional Application No. 60/282,249, filed on Apr. 6, 2001 and to U.S. Provisional Application No. 60/282,131, filed on Apr. 6, 2001.

The entire teachings of the above applications are incorporated herein by reference.

BACKGROUND OF THE INVENTION

This application relates generally to handheld computing devices and more specifically to synchronizing data between a handheld device and a server.

In today's corporate business environments, networked information systems are ubiquitous. Almost as universal is the ability to have data and programs from the computer network available on a mobile device. The most common such devices are laptop computers, but more recently handheld computing devices have begun to proliferate. An example of such an environment is the health care industry. While a networked computer system keeps track of all patient information, doctors have begun to utilize handheld computing devices to view and edit patient data while making rounds. After doing so for a period of time, the doctor will then synchronize the handheld device to a server coupled to the information network. The synchronization process includes the uploading of data from the handheld device to the server, as well as the downloading of data from the server to the handheld device. It can also include updating of software. An example of such a system is that which is offered by PatientKeeper, Inc. The PatientKeeper systems are described in U.S. patent application Ser. No. 09/356,543, titled "Device for Automating Billing Reimbursement," by inventors Matthew D. Barnhart, Stephen S. Hau, Yuri Ostrovsky and MinPont Chien, filed on Jul. 19, 1999 and U.S. patent application Ser. No. 09/356,751, titled "System for Automating Billing Reimbursement," by inventors Matthew D. Barnhart, Stephen S. Hau, Patrick McCormick, George A. Madrid, Craig A. Fields and Sanjay S. Vakil, filed on Jul. 19, 1999, the teachings of which are incorporated herein by reference.

A problem presented by the synchronization process is that data is often changed or updated on the server or network one or more times between synchronizations and is often changed on the handheld device as well. Thus, a problem in keeping data on a plurality of handheld devices and a server properly synchronized is tracking and maintaining the correct version of the data on the multitude of handheld devices. An additional problem is that the objects that are used by the handheld device may not directly map to the objects on the repository in a trivial way.

SUMMARY OF THE INVENTION

The problem of synchronizing handheld devices is similar to the problem of replicating data between multiple distributed copies of a datastore and a single master repository. In order to do this, the version of each object on the distributed copies must be maintained. When a synchronization occurs, information which has changed on the distributed copy must be duplicated in the repository and vice versa.

In order to improve the speed of the synchronization, only changed objects should be moved—those which have a different version number in the repository than on the handheld device. To reduce the amount of data flowing to/from the handheld device, the data required to determine what has changed should already be stored in the repository—thus the repository continuously tracks the state of the handheld as of the last synchronization.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Throughout this description, the term "repository" refers to the master datastore. This is most often one or more databases stored on a server connected to an information network, but as will be seen the methods of synchronization described herein can be applied to any situation where a master set of data is to be distributed to a plurality of devices.

There are actually three separate problems that are simultaneously solved by the synchronization server of the present invention (temporarily ignoring administration issues):

1. Versioning: tracking and maintaining the appropriate version of information for incoming objects from the repository with each instance of the handheld datastore;
2. Refactoring: converting repository objects into new objects suitable for sending to the handheld
3. Minimizing dataflow to and from the handheld.

In addition, the architecture described herein utilizes "interim" objects (also referred to as PK Objects) which isolate handheld formats from repository formats and vice versa. This means that two conversions of the data occur for data to be passed from the Repository to a handheld device. The first is from Repository Objects to PK Objects and the second is from PK Objects to Handheld Objects.

Figure 1:
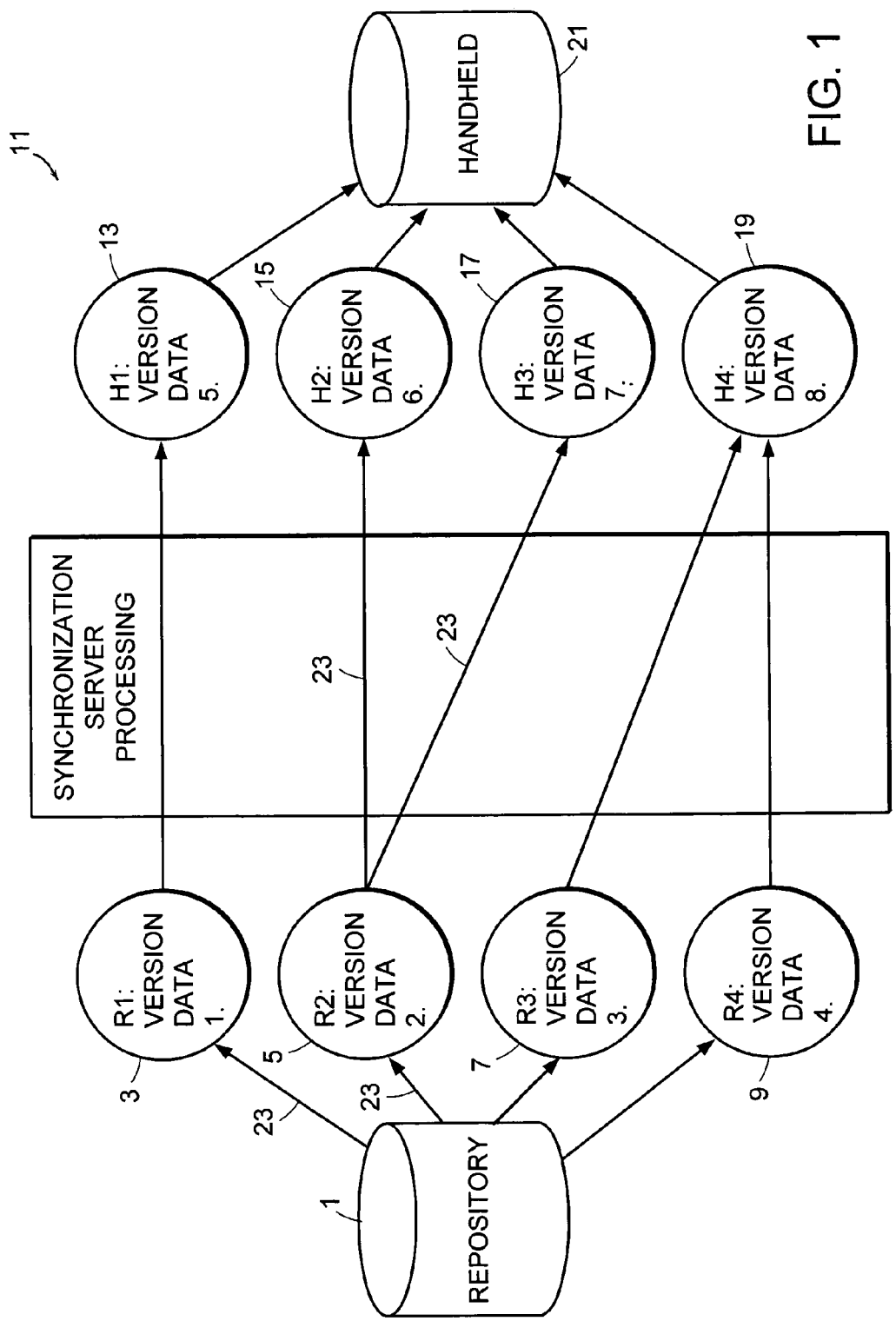
FIG. 1 shows a diagram of the synchronization process.

FIG. 1 shows a high level diagram of the synchronization process. The interim objects described in the previous paragraph are not shown in this diagram. The arrows 23 represent the flow of data, which occurs from left to right in FIG. 1. Objects R1 at 3, R2 at 5, R3 at 7 and R4 at 9 are generated through a query to the repository 1. Each object has two fragments, a version number and some data. These objects are used to construct H1 at 13, H2 at 15, H3 at 17, and H4 at 19, all of which are to be placed on the handheld 21. In this diagram, R1 R4 are "Source" objects and H1 H4 are "Targets." In order to capture whether a source object has changed, each target object maintains the version of the source object from which it was derived. If the version is different, then the source object has changed and may then be updated accordingly.

FIG. 1 shows three possible distribution patterns for data between a repository and a plurality of handheld devices. The first is Single Source, Single Target, which is when data from a single source object is sent to a single target object. In this case of transforming R1 at 3 to H1 at 13 where H1 is simply a copy, or a strict subset of the data in R1. The data mapping is straightforward and the versioning information is simply copied to H1. Thus, VH1=F(VR1) or the version of object H1 is a function of the version of object R1. Any time that R1 changes, H1 needs to be updated.

The next distribution pattern is Single Source, Multiple Targets, which is when data from a single source object is sent to more than one target object. This situation is only slightly more complex than Single Source, Single Target, since the targets are still a strict subset of the data in the source. In this example, objects H2 at 15 and H3 at 17 are each a derivative of the data in R2 at 5. The data mapping is straightforward and the versioning information is simply copied to H2 and H3. Thus, VH2=VH3=F(VR2) or the version of object H2 is equal to that of H3 and is a function of the version of the object R2. Anytime that R2 changes, both H2 and H3 need to be updated.

The last distribution pattern is Multiple Sources, Single Targets, which is when data from more than one source object is sent to a single target object. This situation is more complex than the previous two. In this example, target object H4 at 19 is composed of data from both of the source objects R3 at 7 and R4 at 9. The data mapping may be straightforward but the versioning in H4 must contain versioning information about both R3 and R4. Thus, VH4=F(VR3, VR4) (VH4=VR3+VR4). Anytime that either R3 or R4 change, H4 needs to be updated.

Data that is moved between the Repository 1 and the Handheld 21 goes through two transforms and two mappings. One transform/mapping pair converts between Repository instances and PK Objects. The other transform/mapping pair converts between PK Objects and Handheld instances. Both of these are similar implementations of this approach.

Figure 2:
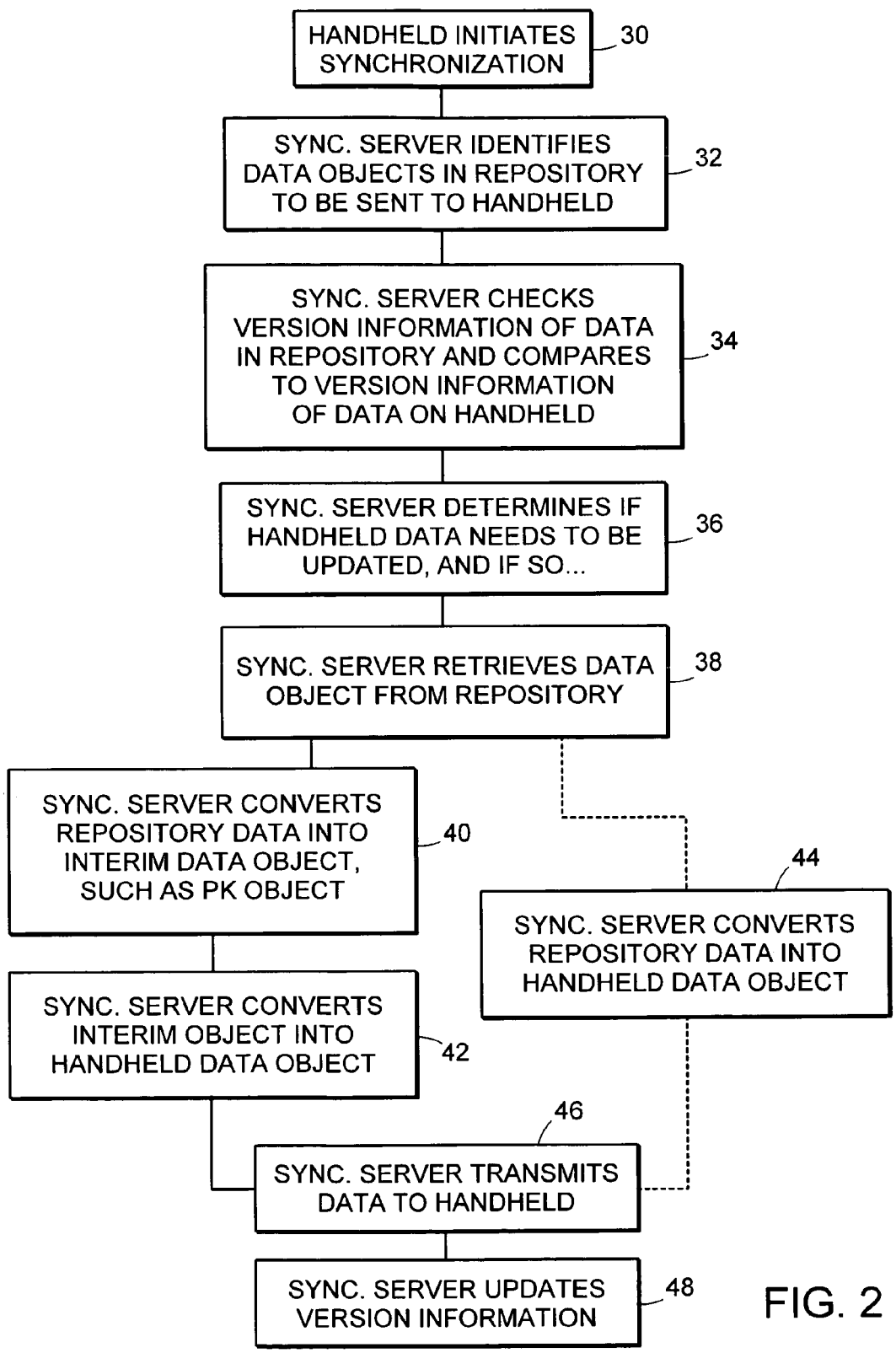
FIG. 2 shows a flow chart of the synchronization process.

FIG. 2 shows a flow diagram of the synchronization process. The process starts with the handheld device initiating the synchronization at step 30. Alternatively, the synchronization server 11 can initiate the process if the handheld device happens to already be in communication with the server. The next step 32 involves the identifying of the data objects in the repository which are to be sent to the handheld device. This can be accomplished by the handheld device specifically requesting certain data, or certain data can be predetermined as needing to be sent to the handheld. The synchronization server 11 then checks at step 34 the version information of the data stored in the repository as well as the version information of the data already on the handheld device, if applicable (i.e. it is not new data to the handheld device). The synchronization server 11 then determines at 36 if the handheld data needs to be updated, and if so, retrieves at 38 the data from the repository. The synchronization server 11 then converts at 40 the repository data in an interim data object, such as a PK Object as will be described later, and the PK Object is then converted at step 42 into an object suitable for sending to the handheld device. The synchronization server 11 then transmits the handheld data object to the handheld device at step 46 and updates at step 48 all of the version information which corresponds to the transaction. An alternative to steps 40 and 42 is step 44, in which repository data is converted directly from repository data to handheld data.

While the above described process was shown for the downloading of repository data to a handheld device, it is readily apparent that the process can apply in the reverse, namely for the uploading of data from a handheld device to the repository.

The processes of versioning the data objects and refactoring, or converting data between repository objects, PK Objects and handheld objects, will now be described in further detail. Versioning requires the storage of the version number of every object on every handheld device. This can result in a large amount of data. However, it can be stored in a simple set of tables with a relatively small number of fields. The table is referred to as the Repository Object Table (ROT), which stores versioning information about objects being served up from the repository. It is useful in several situations:

1. if there is a difference between the current version of the object and the version last provided to the synchronization server 11;
2. if a root or parent object is deleted, one can easily find all the children to delete them as well because the ROT stores the versions of the object's parent and root objects; and
3. to determine whether the latest version of the software has been successfully processed by the synchronization server 11.

TABLE 1

| ROT Fields | |
|---|---|
| User_id | identifies the user associated with this info (write = Repository) |
| R_Object_type | uniquely identifies the type of the object (write = Repository) |
| R_Object_id | uniquely identifies the specific instance of the object (write = Repository) |
| R_Parent_type | uniquely identifies the type of the parent of this object (write = Repository) |
| R_Parent_id | uniquely identifies the parent object of this object (write = Repository) |
| R_Root_type | uniquely identifies the type of the root of this object (write = Repository) |
| R_Root_id | uniquely identifies the root object for this object (write = Repository) |
| Latest_R_version | the version of the object contents (write = Repository) |
| Latest_R_key | a unique identifier for the object contents (write = Repository) |
| R_version | the version of the object contents last provided to Pk sync server (write = Repository) |
| R_key | a unique identifier for the object contents |
| Busy | Determines whether a sync was interrupted while this object was active |
| Deleted | This value will be written to TRUE by Repository when this object is to be removed |

Table 1 describes the fields in the Repository Object Table. Most of these fields are used to identify the object correctly and, when it is a child object, identify all of the other objects it is related to through its parent. The composite of Latest_R_version and Latest_R_key is used to specify the latest version of the object that is available from the repository. The composite is used because the key may not be unique (hash collision), or the versioning may not be available or reliable. Similarly, the composite of R_version and R_key is used to specify the version of the object that was most recently sent from the repository. When Latest_R_version/Latest_R_key does not correspond to R_version/R_key, there is a new version of the object located in the Repository.

Once it is determined that data needs to be transferred from the Repository to the Handheld, the data must be converted, or refactored, from Repository Objects to PK Objects. This is accomplished with the Repository Pk Instance Mapping Table (R PK). This table maps the relationship between Repository Objects and PK Objects. For each user, each relationship between a Repository Object and a PK Object appears as a single record in this table.

TABLE 2

Repository PK Instance Mapping (R PK)

| | |
|---|---|
| User_id | identifies the user associated with this info |
| R_Object_type | uniquely identifies the type of the source object |
| R_Object_id | uniquely identifies the specific instance of the source object |
| PK_Object_type | uniquely identifies the type of the source object |
| PK_Object_id | uniquely identifies the specific instance of the source object |
| PK_Parent_type | uniquely identifies the type of the parent of this object |
| PK_Parent_id | uniquely identifies the parent object of this object |
| PK_Root_type | uniquely identifies the type of the root of this object |
| PK_Root_id | uniquely identifies the root object for this object |
| Latest_R_version | the version of the latest repository object contents |
| Latest_R_key | a unique identifier for the latest repository object contents |
| R_version | the version of the repository object contents used to generate this PK Object |
| R_key | a unique identifier for the repository object contents used to generate this PK Object |
| PK_version | the version of the object contents last provided to Pk sync server |
| PK_key | a unique identifier for the object contents |
| Busy | Determines whether a sync was interrupted while this object was active |
| Deleted | This value will be written to TRUE by Repository when this object is to be removed |

The Latest_R_key is a hash value of the data in the Latest_R_Object to allow one to quickly find this object if it is stored within a cache. Again, the combination of Latest_R_Key and Latest_R_Version is used to uniquely identify the object that the PK server has most recently received from the Repository. By contrast, R_Version/R_Key is the version that was used to generate this instance of the PK_Object. These values will be copied from the Repository Object Table when the PK_Object is generated. Also, note that a single PK_Object can have multiple entries in this table one for each R_Object from which it was generated. Similarly, a single R_Object will have one entry for each PK_Object that uses it.

As described before, the second mapping that must occur is the conversion from PK Objects to Handheld Objects. Table 3 maps the relationship between PK Objects and Handheld Objects. For each user, each relationship between a PK Object and a Handheld Object appears a single record in this table.

TABLE 3

PK Objects to Handheld Objects Mapping Table (PK HH)

| | |
|---|---|
| User_id | identifies the user associated with this info |
| PK_Object_type | uniquely identifies the type of the source object |
| PK_Object_id | uniquely identifies the specific instance of the source object |
| HH_Object_type | uniquely identifies the type of the source object |
| HH_Object_id | uniquely identifies the specific instance of the source object |
| HH_Parent_type | uniquely identifies the type of the parent of this object |
| HH_Parent_id | uniquely identifies the parent object of this object |
| HH_Root_type | uniquely identifies the type of the root of this object |
| HH_Root_id | uniquely identifies the root object for his object |
| Latest_PK_version | the version of the latest repository object contents |
| Latest_PK_key | a unique identifier for the latest repository object contents |
| PK_version | the version of the repository object contents used to generate this PK Object |
| PK_key | a unique identifier for the repository object contents used to generate this PK Object |
| HH_version | the version of the object contents last provided to handheld device |
| HH_key | a unique identifier for the object contents |
| Busy | Determines whether a sync was interrupted while this object was active |
| Deleted | This value will be written to TRUE by Repository when this object is to be removed |

The PK_key is a hash value of the data in the PK_Object to allow one to quickly find this object if it is stored within the cache. Again, the combination of Latest_PK_Key and Latest_PK_Version is used to uniquely identify the object that the PK server has most recently generated from the PK Object. By contrast, PK_Version/PK_Key is the version that was used to generate this instance of the HH_Object. These values will be copied from the R PK Instance Mapping Table when the HH_Object is generated. Also, note that a single HH_Object can have multiple entries in this table one for each PK_Object that from which it is generated. Similarly, a single PK_Object will have one entry for each HH_Object that uses it. Typically, PK Objects and Handheld Objects will correlate, typically generating a single entry per Handheld Object in this table.

The invention will be further demonstrated with the following examples which will walk through the steps of various synchronization scenarios. In these examples, simple mapping corresponds to a single source and single or multiple targets at each stage of the mapping (R_Object to PK_Object to HH_Object). A complex mapping is a multiple source to single target example.

Two important assumptions are as follows:
1. a collection of PK_Objects can be generated directly from a collection of R_Objects, and a collection of HH_Objects can be generated directly from a collection of PK_Objects; and
2. the necessary set of R_Objects or PK_Objects (respectively) can be identified from the collection of PK_Objects.

Furthermore, these examples are written to do a class at a time, but actually can do all of the steps at once for each object.

EXAMPLE 1

New Entries Appear in the Repository (Simple Mapping)

In the Repository:
1. Repository responds to read (or read_new) with a collection of new objects
2. in ROT, for collection of R_Objects, for this User_id, new entries are created with the appropriate R_Object identifiers
3. in ROT, for collection of R_Objects, for this User_id, Latest_R_Version and Latest_R_Key are set to the correct value
4. in ROT, for collection of R_Objects, for this User_id, R_Version and R_Key are left at zero
5. in ROT, for collection of R_Objects, for this User_id, Busy is set to TRUE In the Repository Translator:
6. the collection of PK_Objects is derived from the collection of R_Objects
7. in R PK, for collection of PK_Objects, for this User_id, new entries are created with the appropriate PK_Object, R_Object and parent identifiers
8. in R PK, for collection of PK_Objects, for this User_id, Latest_R_Version and Latest_R_Key are set to the correct value
9. in R PK, for collection of PK_Objects, for this User_id, R_Version and R_Key are left at zero
10. in R PK, for collection of PK_Objects, for this User_id, PK_Version and PK_Key are left at zero
11. in R PK, for collection of PK_Objects, for this User_id, Busy is set to TRUE In the Handheld Translator:
12. the collection of HH_Objects is derived from the collection of PK_Objects
13. in PK HH, for collection of HH_Objects, for this User_id, new entries are created with the appropriate HH_Object, PK_Object and parent identifiers
14. in PK HH, for collection of HH_Objects, for this User_id, Latest_PK_Version and Latest_PK_Key are set to the correct value
15. in PK HH, for collection of HH_Objects, for this User_id, PK_Version and PK_Key are left at zero
16. in PK HH, for collection of HH_Objects, for this User_id, HH_Version and HH_Key are left at zero
17. in PK HH, for collection of HH_Objects, for this User_id, Busy is set to TRUE
18. collection of HH_Objects is sent to handheld
19. get positive response from HH
20. in PK HH, for collection of HH_Objects, for this User_id, HH_Version and HH_Key are set to Latest_HH_Version and Latest_HH_Key, update HH_UID, clear Busy
21. in PK HH, for collection of HH_Objects, for this User_id, PK_Version and PK_Key are set to Latest_PK_Version and Latest_PK_Version, clear Busy In the Repository Translator:
22. in R PK, for collection of PK_Objects, for this User_id, R_Version and R_Key are set to Latest_R_Version and Latest_R_Version, clear Busy
23. in ROT, for collection of R_Objects, for this User_id, R_Version and R_Key are set to Latest_R_Version and Latest_R_Version, clear Busy
24. Done.

EXAMPLE 2

Entries are Updated in the Repository (Simple Mapping)

In the Repository:
1. Repository responds to read to the repository returns collection of updated objects
2. in ROT, for collection of R_Objects, for this User_id, entries with appropriate R_Object identifiers have Latest_R_Version and Latest_R_Key set to the updated incoming value
3. in ROT, for collection of R_Objects, for this User_id, Busy is set to TRUE In the Repository Translator:
4. in R PK, for collection of R_Objects, for this User_id, Latest_R_Version and Latest_R_Key are set to the updated value.
5. the collection of PK_Objects is generated based on entries in the PK HH table where Latest_R_Version/Latest_R_Key is not equal to R_Version/R_Key, for this User_id
6. in R PK, for this User_id, Busy is set to TRUE In the Handheld Translator:
7. in PK HH, for collection of PK_Objects, for this User_id, Latest_PK_Version and Latest_PK_Key are set to the updated value.
8. the collection of HH_Objects is generated based on entries in the PK HH table where Latest_PK_Version/Latest_PK_Key is not equal to PK_Version/PK_Key
9. in PK HH, for collection of HH_Objects, for this User_id, Busy is set to TRUE
10. collection of HH_Objects is sent to handheld
11. get positive response from HH
12. in PK HH, for collection of HH_Objects, for this User_id, HH_Version and HH_Key are set to Latest_HH_Version and Latest_HH_Key, update HH_UID, clear Busy
13. in PK HH, for collection of HH_Objects, for this User_id, PK_Version and PK_Key are set to Latest_PK_Version and Latest_PK_Version, clear Busy In the Repository Translator:
14. in R PK, for collection of PK_Objects, for this User_id, R_Version and R_Key are set to Latest_R_Version and Latest_R_Version, clear Busy
15. in ROT, for collection of R_Objects, for this User_id, R_Version and R_Key are set to Latest_R_Version and Latest_R_Version, clear Busy
16. Done.

EXAMPLE 3

Deleting an Entry in the Repository (Simple Mapping)

In the Repository:
1. Repository responds to read to the repository returns identifiers for a collection of deleted objects 2. in ROT entries with appropriate R_Object identifiers have Latest_R_Version and Latest_R_Key are set to the updated incoming value
3. in ROT, for this User_id, Busy is set to TRUE
4. in ROT Deleted is set to TRUE, for this User id.

In the Repository Translator:
5. in R PK, for this User_id, for collection of R_Objects, Busy is set to TRUE
6. in R PK, for this User_id, Deleted is set to TRUE
7. create collection of PK_Objects entries from entries with User_id, PK_Object_ID, Deleted==TRUE In the Handheld Translator:
8. in PK HH, for this User_id, for collection of PK_Objects, Busy is set to TRUE
9. in PK HH, for this User_id, Deleted is set to TRUE
10. create collection of HH_Objects entries from entries with User_id, HH_Object_ID, Deleted==TRUE
11. message to delete HH_Objects is sent to handheld
12. get positive response from HH
13. in PK HH, for this User_id, delete entries for the collection of HH_Objects, where Deleted==TRUE and Busy==TRUE In the Repository Translator:
14. in R PK, for this User_id, delete entries for the collection of PK_Objects where Deleted==TRUE and Busy==TRUE
15. in ROT, for this User_id, delete entries for the collection of R_Objects where Deleted==TRUE and Busy==TRUE
16. Done.

EXAMPLE 4

Recovery from Handheld Failure (Simple Mapping)

In the Repository:
1. Generate list of identifiers for a collection of R_Objects where Busy==TRUE, for this User_id In the Repository Translator:
2. in R PK, for this User_id, for collection of R_Objects, Busy is set to TRUE
3. create collection of PK_Objects entries from entries with User_id, Busy==TRUE [create collection of all busy PK_Objects]

In the Handheld Translator:
4. in PK HH, for this User_id, for collection of PK_Objects, Busy is set to TRUE
5. in PK HH, for this User_id, entries where Busy==TRUE have HH_Version and HH_Key cleared, Busy is cleared In the Repository Translator:
6. in R PK, for this User_id, entries where Busy==TRUE have PK_Version and PK_Key cleared
7. in ROT, for this User_id, entries where Busy==TRUE have R_Version and R_Key cleared
8. Now do an Update.

Several things can be done to optimize the synchronization process. The first is caching. By caching PK Objects and Handheld Objects, unnecessary and duplicative converting/refactoring of the data objects can be avoided if they remain in the cache. Caching will also help avoid requesting data from the Repository that may not be needed if it is already in the cache. Second, don't ask for refreshes or version numbers that we don't have to: no shared data. Third, send as little to the handheld as possible. Lastly, keep common master objects separate from personal objects for as long as possible While this invention has been particularly shown and described with references to preferred embodiments thereof, it will be understood by those skilled in the art that various changes in form and details may be made therein without departing from the scope of the invention encompassed by the appended claims.

What is claimed is:

1. A method of synchronizing data between a repository and handheld devices, comprising the steps of, in a synchronization server:
receiving repository data objects;
maintaining a repository version identifier for each repository data object;
converting the repository data objects into interim data objects and then converting the interim data objects into handheld data objects suitable for sending to the handheld devices;
maintaining a version identifier for each converted handheld data object, the version identifiers being derived from the repository version identifiers of the repository data objects from which the handheld data objects were converted;
sending handheld data objects to the handheld devices;
maintaining a handheld version identifier for each handheld data object sent to a handheld device;
receiving a synchronization request on the synchronization server; identifying one or more handheld data objects and corresponding repository data objects in the repository for synchronization;
checking version identifiers of the data objects to be synchronized; determining handheld data objects that need to be updated based on a comparison of the version identifiers;
sending the determined handheld data objects, updated from repository data objects, to the handheld device; and
updating the version identifiers of the updated handheld data objects.

2. The method of claim 1 wherein the synchronization request comprises a request for new data objects in the repository.

3. The method of claim 1 wherein the synchronization request comprises a request for data which was updated in the repository.

4. The method of claim 1 further comprising the step of storing the data objects in a memory cache after completion of the synchronization.

5. The method of claim 1 wherein the step of converting includes converting a handheld data object from plural repository data objects.

6. The method of claim 1 wherein the version identifiers are maintained in tables that map repository data objects to handheld data objects.

7. The method as claimed in claim 1 wherein the repository data objects are only converted to handheld data objects if it is determined that the handheld data objects need to be updated after a synchronization request.

8. A synchronization server for synchronizing data front plural databases to plural handheld devices comprising:
repository data objects obtained from the plural databases;
handheld data objects converted from the repository data objects;

data associating version identifiers with repository data objects and version identifiers with the handheld data objects and mapping repository data objects to handheld data objects, the handheld data object version identifiers being derived from the repository data object version identifiers;

a program for synchronizing repository data objects with data objects stored on handheld devices including the steps of:

identifying repository data objects to be seat to a handheld device;

comparing version identifiers of the handheld data objects with version identifiers of the repository data objects from which the handheld data objects were derived to determine whether the handheld data objects need to be updated;

converting repository data objects into interim data objects and then converting the interim data objects into updated handheld data objects; and transferring updated handheld data objects, converted from repository data objects, to a handheld device when it is determined that the handheld data objects need to be updated.

9. The synchronization server as claimed on 8 wherein handheld data objects derived from the repository data objects include handheld data objects derived from plural repository data objects.

10. The synchronization server as claimed on 8 wherein the version identifiers are maintained in tables that map repository data objects to handheld data objects.

11. The synchronization server as claimed on 8 wherein the repository data objects are only converted to handheld data objects if it is determined that the handheld data objects need to be updated after a synchronization request.

12. The synchronization server as claimed on 8 that maintains a handheld version identifier for each handheld data object sent to a handheld device.

* * * * *

UNITED STATES PATENT AND TRADEMARK OFFICE
CERTIFICATE OF CORRECTION

PATENT NO. : 7,099,896 B2  Page 1 of 1
APPLICATION NO. : 10/356366
DATED : August 29, 2006
INVENTOR(S) : Craig A. Fields et al.

It is certified that error appears in the above-identified patent and that said Letters Patent is hereby corrected as shown below:

Column 10
Line 63, delete "front" and insert -- from --

Column 11
Line 10, delete "seat" and insert -- sent --

Column 12
Line 5, delete "on" and insert -- in --;
Line 7, delete "include handheld" and insert -- include a handheld --;
Line 9, delete "on" and insert -- in --;
Line 12, delete "on" and insert -- in --;
Line 16, delete "on" and insert -- in--.

Signed and Sealed this

Fifth Day of December, 2006

JON W. DUDAS
*Director of the United States Patent and Trademark Office*